United States Patent [19]

Ohshima et al.

[11] 4,089,648
[45] May 16, 1978

[54] PROCESS FOR DRY DYEING SYNTHETIC OR SEMI-SYNTHETIC, OR NATURAL MATERIALS

[75] Inventors: Taizo Ohshima, Tondabayashi; Masao Nishikuri, Hirakata; Yasuyuki Suzuki; Kunio Yamada, both of Toyonaka, all of Japan

[73] Assignee: Sumitomo Chemical Company, Limited, Japan

[21] Appl. No.: 785,602

[22] Filed: Apr. 7, 1977

[30] Foreign Application Priority Data

Apr. 15, 1976  Japan .................................. 51-43451

[51] Int. Cl.² .......................... C09B 1/00; C09D 11/00
[52] U.S. Cl. ....................... 8/39 R; 8/2.5 A;
    8/4; 8/12; 8/21 C; 8/162 B; 8/177 R; 8/178 R;
    8/179; 106/22
[58] Field of Search ................... 8/39 R, 2.5 A, 4, 12,
    8/2.5 A, 39 R; 106/22

[56] References Cited

FOREIGN PATENT DOCUMENTS

| 1,223,330 | 2/1960 | France. |
| 6,500,422 | 3/1965 | Japan. |
| 6,603,712 | 3/1966 | Japan. |
| 723,079 | 2/1955 | United Kingdom. |

*Primary Examiner*—A. Lionel Clingman
*Attorney, Agent, or Firm*—Wenderoth, Lind & Ponack

[57] ABSTRACT

Synthetic or semi-synthetic, or natural materials are dyed deep turquoise blue by contacting the material with a vaporized dye of the formula,

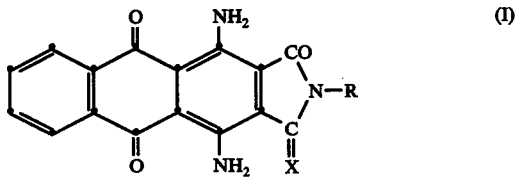

wherein X is oxygen or imino, and R is $C_4$–$C_5$ alkyl or $C_4$–$C_5$ alkenyl.

7 Claims, No Drawings

PROCESS FOR DRY CLEANING SYNTHETIC OR SEMI-SYNTHETIC, OR NATURAL MATERIALS

The present invention relates to a process for dry dyeing a synthetic or semi-synthetic, or natural material.

More particularly, it relates to a process for dry transfer printing a synthetic or semi-synthetic, or natural material.

Dyes for a dry dyeing process, particularly a dry transfer printing process, are required to vaporize relatively easily. Disperse dyes commonly used for dyeing polyester fibers from a water medium are so resistant to sublimation that they are not suitable for a dry transfer printing process in most cases with the exception of an extremely limited number of the dyes.

Among them, there are scarcely turquoise blue dyes which are easily vaporizable and, if any, they are extremely so poor in light fastness that their practical values are very low. For the reasons described above, the inventors extensively studied to develop the turquoise blue dyes suitable for dry dyeing, particularly dry tranfer printing, which have a good transfer dyeability to give dyed materials excellent in fastnesses to light, washing rubbing.

The present invention provides (i) a dry dyeing ink composition comprising as a coloring agent vaporizable upon application of heat and a binding agent, characterized by using as the coloring agent a dye of the formula (I),

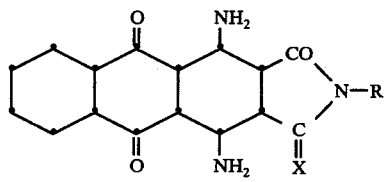

wherein X is an oxygen atom or NH group, and R is an alkyl or alkenyl group having 4 to 5 carbon atoms, (ii) a dry dyeing carrier prepared by applying the ink as defined above, onto a carrier material, and (iii) a process for dry dyeing a synthetic or semi-synthetic, or natural material, which comprises using the dry dyeing carrier as defined above.

In the specification, the term "coloring agent vaporizable upon application of heat" is intended to mean that the coloring agent is sublimable or evaporizable through melting upon application of heat, and the term "dry dyeing" is intended to mean a dyeing with substantially no dyeing solvent and with use of phenomena of the vaporaizable dye such as sublimation, evaporation through melting, and transference. Specifically speaking, the commonly applied dry dyeing is a dry transfer printing which comprises bringing a carrier with a coloring layer containing the vaporizable dyes into an intimate contact with the material to be dyed, followed by heating. In addition, the gas-phase dyeing disclosed in Japanese Patent Publication (unexamined) No. 134,980/1974 which comprises making use of the volatility of dyes under reduced pressure, is also included in the scope of the dry dyeing of the present invention.

As the dyes of the formula (I) used in the present invention, there may be exemplified those having the following groups as R in the formula (I):

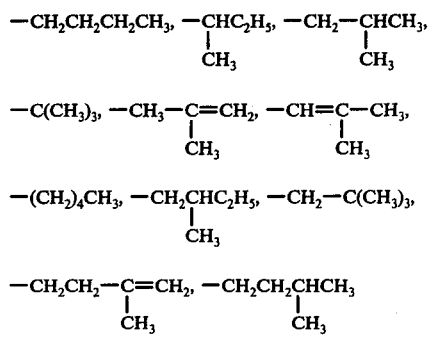

These dyes are conceptually or specifically known in Japanese Patent Publication Nos. 3384/1955, 4222/1965 and 3712/1966. They can produced by reacting 1,4-diaminoanthraquinone-2,3-dicarboxyimide or 1,4-diaminoanthraquinone-2,3-dicarboxylic anhydride with an aliphatic amine, or by reacting 1-oxo-3-imino-4,7-diamino-5,6-phthaloylisoindoline with an alkylating agent.

The present dry dyeing inks comprise the dyes of the formula (I) and, binding agents, and optionally oils, solvents, assisting agents and the like which are disclosed, for example, in U.S. Pat. No. 3,363,557, and in Japanese Patent Publication Nos. 18793/1964, 22912/1971 and 44054/1972, and French Patent No. 1,223,330. Further, the present transfer printing inks may contain a filler useful for the improvement of vaporizability, and, if a need arises, they may contain dyes of different colors, fluorescent whitening agents, resin finishing agents and other chemical agents. These components are properly blended and kneaded to obtain the present desired ink, depending upon the printing processes employed. The present inks also include electrostatic printing toners containing electro-chargeable resins disclosed in Japanese Patent Publication No. 12237/1972 and Japanese Patent Publication (unexamined) No. 41085/1973.

The present dry dyeing ink composition can be prepared by a method known per se, for example, disclosed in the above mentioned publications and others. The amount of the dye (I) is at most 40%, usually not less than 0.1%, preferably 1 to 30%, by weight based on the weight of the ink composition. The amount of binding agents depends on the application form of ink. Usually, it is within a range between 2% and 95% by weight based on the weight of the ink composition.

The carriers of the present invention are prepared, for example, by printing the dry dyeing ink or electrostatic printing toner containing the dyes of the formula (I) on a carrier material. As the carrier materials, any of the sheets which are resistant to heat under transfer printing conditions may be used. For example, there may be exemplified paper, cellophane, metallic foil, plastic film, cellulosic textile and the like. Among them, paper is particularly preferred.

The printing process may be any of the lithographic printing, letterpress printing, intaglio printing and mimeographic printing processes. For example, there may be exemplified the off-set printing, flexographic printing, gravure printing and screen printing processes and special printing processes such as the electrostatic printing process.

The dry dyeing in accordance with the present invention is carried out using the carriers thus obtained under conditions commonly employed at atmospheric pressure or under reduced pressure. In transfer printing, it is necessary to bring the coloring layer of the carrier into intimate contact with materials to be dyed. This can optionally be achieved by applying pressure or suction. As the heat source, a hot plate, hot air, hot steam, infrared ray irradiation or microwave irradiation may be used.

The materials to be dyed according to the present invention include fiber goods, synthetic leathers, coating films, sheets and molded products which are produced by processing synthetic and semi-synthetic substances such as polyesters, polyamides, cellulose acetates, polyacrylonitriles, polyurethanes and polyvinyl chlorides. Further, the following materials and goods are also included in the scope of said materials: materials impregnated, finished or coated with these synthetic or semi-synthetic substances; cellulosic fiber goods or other natural fiber goods which are modified or treated with certain kinds of assisting agent so as to make dyeable with a vaporizable dye; and anodized aluminum goods.

According to the present dry dyeing, the dyeing can be achieved in a wide range of low depth to high depth to give the dyed materials of brilliant color having excellent fastnesses particularly to light, rubbing and washing.

In the foregoing patent publications, the homologues having the following groups as R in the formula (I) are disclosed in addition to the compound of the present invention:

$-CH_3, -C_2H_5, -C_3H_7, -CH_2-CH=CH_2,$ $-C_6H_{13}, -C_7H_{15}, -C_8H_{17}, -C_2H_4OH,$

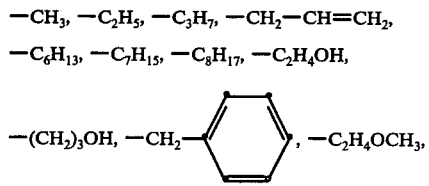

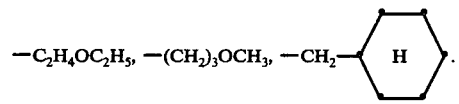

The compounds of the present invention are however extremely superior to these homologues in the dyeing property in dry dyeing. This is apparent, for example, from the results of comparative experiments shown in Table 1.

COMPARATIVE EXPERIMENT

As the turquoise blue dyes, the following dyes were used: the present dyes (1) to (4) which are used in Examples 1 to 4, respectively; and the dyes (a) to (j) which are conventionally used for transfer printing or have a similar structure to the present dyes. Polyester textured fabrics were transfer-printed according to the method in Example 1, and transfer dyeability, light fastness and rubbing fastness were measured. The results are shown in Table 1.

As is apparent from the results in Table 1, the present dyes (1) to (4) have transfer dyeability as high as 150 to 200%, as compared with with control dyes having the color range of greenish blue to turquoise blue, (a) to (g), which are conventionally used for transfer printing or have similar structures to the present dyes. Among the conventional transfer printing dyes, there are included such dyes that have a good transfer dyeability like the control dyes (h) to (j), but they are inferior in light fastness and poor in practical value. In this repect, the dyes of the present invention are superior not only in transfer dyeability but also in light fastness and rubbing fastness. Accordingly, it may be said that they are turquoise blue dyes for transfer printing having excellent properties. As mentioned above, it is a surprising fact that the compounds alone of the formula (I) wherein R is an alkyl or alkenyl group having 4 to 5 carbon atoms extremely superior.

Table 1

| | | Formula | | Transfer dyeability* | | Fastness** | | |
| --- | --- | --- | --- | --- | --- | --- | --- | --- |
| | | | | | Relative | Rubbing | | Light fastness |
| | | R | X | K/S | K/S(%) | dry | wet | |
| Example | (1) | $-(CH_2)_3CH_3$ | O | 12.9 | 195 | 4 – 5 | 5 | 7 |
| | (2) | $-CH\begin{smallmatrix}C_2H_5\\CH_3\end{smallmatrix}$ | O | 12.5 | 189 | 4 – 5 | 5 | 7 |
| No. | (3) | $-CH_2C=CH_2$ \| $CH_3$ | NH | 11.4 | 173 | 4 – 5 | 5 | 7 |
| | (4) | $-(CH_2)_4CH_3$ | O | 9.2 | 139 | 4 – 5 | 5 | 7 |
| Reference Example | (a) | $-(CH_2)_3OCH_3$ | O | 6.6 | 100 | 4 – 5 | 5 | 7 |
| | (b) | $-C_2H_4OH$ | O | 2.5 | 38 | 3 | 4 – 5 | 7 |
| | (c) | $-CH_3$ | NH | 1.7 | 26 | 3 – 4 | 4 – 5 | 7 |
| | (d) | $-CH_3$ | O | 1.3 | 20 | 3 – 4 | 4 – 5 | 7 |
| | (e) | $-C_3H_7$-n | O | 6.0 | 91 | 3 – 4 | 4 – 5 | 7 |
| | (f) | $-C_6H_{13}$-n | O | 3.3 | 50 | 3 – 4 | 4 – 5 | 7 |
| | (g) | $-C_8H_{17}$-n | NH | 3.2 | 48 | 2 – 3 | 4 – 5 | 7 |
| | (h) | 1-Amino-2-butoxycarbonyl-4-n-butylamino-anthraquinone | | 7.2 | 109 | 3 | 5 | 2 |
| | (i) | 1,4-Dicyclohexylaminoanthraquinone | | 9.6 | 145 | 4 – 5 | 4 – 5 | 1 |
| | (j) | 1-n-Butylamino-4-cyclohexylamino- | | 12.1 | 183 | 4 – 5 | 5 | 1 |

Table 1-continued

| Formula | | Transfer dyeability* | | Fastness** | | |
|---|---|---|---|---|---|---|
| R | X | K/S | Relative K/S(%) | Rubbing dry | wet | Light fastness |
| anthraquinone | | | | | | |

Note:
*Transfer dyeability

Transfer-printed fabrics were each measured for reflectance on a spectrophometer (RC-330 model, produced by Shimazu Seisakusho Co., Ltd.). The transfer dyeability was calculated as K/S from the following equation on the basis of Kubelka-Munk function:
$K/S = (1 - a)^2/2a$ ($a$: reflectance)

K/S values of the compounds in Examples (1) to (4) and Reference Examples (b) to (j) were each expressed in a ratio to K/S value of the compound in Reference Example (a), with the latter K/S value as 100%. The ratios obtained were taken as relative transfer dyeability. ** Light fastness (JIS L-0842-1971)

The transfer-printed fabrics were each exposed in a carbon arc lamp light for 80 hours. Rubbing fastness (JIS L-0849-1971)

The fastness was measured according to both the dry and wet processes.

The present invention will be illustrated specifically with reference to the following examples. In the examples, all parts and percentages are by weight.

EXAMPLE 1

Ten parts of the dye of the formula (1),

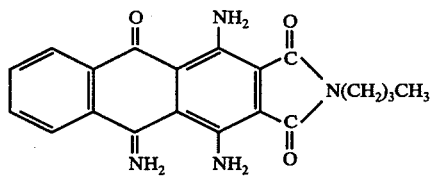
(1)

10 parts of Acryloid B-66 (acrylic polymer, produced by Eastman Kodak Co., Ltd.), 48 parts of toluene and 32 parts of isopropyl alcohol were mixed and kneaded uniformly in an attritor to obtain a gravure printing ink. This ink was printed on a high-quality single glazed paper by means of gravure proof press (produced by Toshiba Kikai Co., Ltd.) and dried to obtain a transfer paper.

Next, transfer printing was carried out on a transfer printing machine (Nao-printer NP-IF, produced by Naomoto Kōgyō Co., Lts.) by placing this transfer paper and polyester textured fabric (Sillook produced by Toray Co., Ltd.) one upon another and pressing at 200° C. for 40 seconds under a pressure of 100 g/cm². As a result, the dye of the formula (1) showed extremely superior transfer dyeability and the turquoise blue color obtained was brilliant and had a feeling of extremely high depth. The fastnesses of the printed goods thus obtained were extremely good and graded numerically as follows: light fastness 7; washing fastnesses 5 (for all of alteration, staining on nylon and staining on cotton); rubbing fastnesses 4-5 (dry process) and 5 (wet process).

EXAMPLE 2

Thirty parts of the dye of the formula (2),

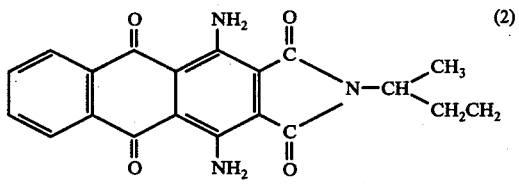
(2)

63 parts of a rosin-modified phenol resin varnish, 5 parts of a lacquer linseed oil and 2 parts of a cobalt dryer were mixed and kneaded uniformly on a roll mill to obtain an off-set printing ink. This ink was printed on a special double art paper by means of a RI printing machine (produced by Akira Seisakujo Co., Ltd.) to obtain a transfer paper.

Next, polyester taffeta was transfer-printed at 205° C. for 30 seconds on a transfer printing machine (Naoprinter NP-IF), using this transfer paper. As a result, the dye of the formula (2) showed extremely superior transfer dyeability and the polyester fabric was dyed in a turquoise blue color having brilliancy and a feeling of extremely high depth. The fastnesses of the print thus obtained were extremely good and graded numerically as follows: light fastness 7; washing fastnesses 5 (for all of alteration, staining on nylon and staining on cotton); rubbing fastnesses 4-5 (dry process) snd 5 (wet process).

Separately from this, vacuum transfer printing was carried out on a vacuum transfer printing machine (Ariloper FV-1, produced by Naomoto Kōgyō Co., Ltd.) by placing said transfer paper and polyester jersey one upon another and keeping them at 190° C. for 40 seconds under a reduced pressure of 10 mmHg. As a result, the dye in the ink showed extremely superior transfer dyeability and the polyester fabric was dyed in a turquoise blue color having brilliancy and a feeling of extremely high depth. The fastnesses of the print were also good.

EXAMPLE 3

1.0 part of the powdery dye of the formula (3),

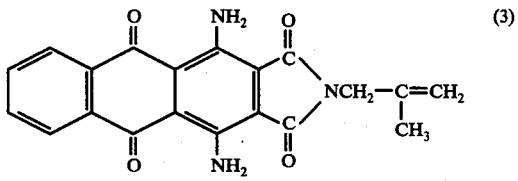
(3)

and 2.0 parts of a naphthalene sulfonic acid/formaldehyde condensate were mixed and dispersed in an aqueous medium to obtain a dispersion liquor. Next, 5 parts of the powdery dye resulting from drying of the dispersion liquor, 3 parts of Sumikaron Yellow E-4GL (C.I. Disperse Yellow 51, produced by Sumitomo Chemical Company, Limited), 82 parts of a 10% paste of sodium alginate and 10 parts of water were kneaded to obtain a printing paste. This printing paste was printed on a super calender paper by hand-screening and dried to obtain a transfer paper.

Next, transfer printing was carried out on a transfer printing machine (Nao-printer NP-IF) by placing this transfer paper and polyester knitting goods one upon another and pressing as 205° C. for 40 seconds under a pressure of 60 g/cm². As a result, the polyester goods were dyed in a green color having such brilliancy and a feeling of extremely high depth that could not be obtained by the conventional transfer printing processes. Further, the print obtained had excellent fastnesses to light, washing and rubbing.

EXAMPLE 4

Ten parts of the dye of the formula (4),

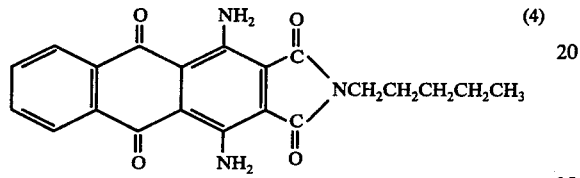

(4)

10 parts of Ethcel Standard 7 cps (produced by Dow Chemical Co., Ltd. in U.S.A.), 72 parts of isopropyl alcohol and 8 parts of ethyl alcohol were mixed, and treated in the same manner as in Example 1 to obtain a transfer paper.

Next, transfer printing was carried out on a transfer printing machine (Nao-printer NP-IF) by placing this transfer paper and polyester georgette one upon another and pressing at 200° C. for 40 seconds under a pressure of 100 g/cm². As a result, the dye in the ink showed extremely superior transfer dyeability and the polyester goods were dyed in a turquoise blue color having brilliancy and a feeling of extremely high depth. Further, the print had excellent fastnesses to light, washing and rubbing.

Separately from this, transfer printing was applied to polyethylene terephthalate film (Lumirror #188, produced by Toray Co., Ltd.) and polyester/cotton blended poplin (blending ratio 65:35) using the same transfer paper. In this case, the polyester/cotton blended poplin was previously padded with a 10% aqueous solution of the following compound (A) and dried.

Compound (A)

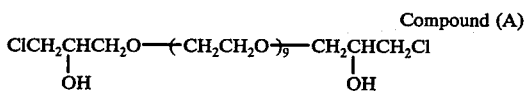

As a result, in either case, the dye in the ink showed extremely superior transfer dyeability, the turquoise blue color obtained had brilliancy and a feeling of extremely high depth, and the fastnesses of the prints were also good.

Further, transfer printing was applied to nylon taffeta and acrylic fibers at 190° C. for 60 seconds. Also in this case, the dye in the ink showed extremely superior transfer dyeability and the turquoise blue color obtained had brilliancy and a feeling of extremely high depth.

What is claimed is:

1. A dry dyeing ink composition comprising a coloring agent vaporizable upon application of heat and a binding agent, characterized by using as the coloring agent a dye of the formula,

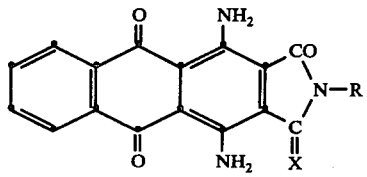

wherein X is an oxygen atom or NH group, and R is a $C_4$ or $C_5$ alkyl or $C_4$ or $C_5$ alkenyl group.

2. The ink composition according to claim 1, wherein R in said formula is

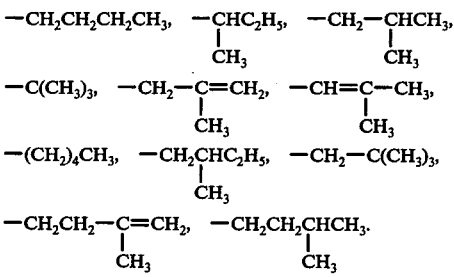

3. The ink composition according to claim 1, wherein the amount of the dye is at most 40% by weight based on the weight of the ink composition.

4. In a dry dyeing ink comprising a coloring agent vaporizable upon application of heat and a binding agent, an improvement which comprises using as the coloring agent a dye of the formula,

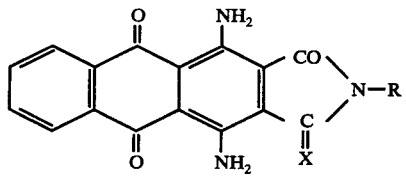

wherein X is an oxygen atom or NH group, and R is a $C_4$ or $C_5$ alkyl or $C_4$ or $C_5$ alkenyl group.

5. A dry dyeing carrier composed of (i) a coloring layer comprising a coloring agent vaporizable upon application of heat and (ii) a carrier material, characterized by comprising as the coloring agent a compound of the formula,

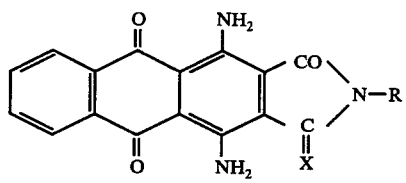

wherein X is an oxygen atom or NH group, and R is an alkyl or alkenyl group having 4 to 5 carbon atoms.

6. A process for dry dyeing a synthetic or semisynthetic, or natural material, characterized by bringing the coloring layer of the dry dyeing carrier according to claim 5 into intimate contact with the said material, and applying heat thereto.

7. A material dyed by the process of claim 6.

* * * * *